March 31, 1942.   O. C. SCHLEMMER ET AL   2,277,784
NIGHT DRIVING LIGHT FOR AUTOMOBILE INTERIORS
Filed June 26, 1939   2 Sheets-Sheet 1
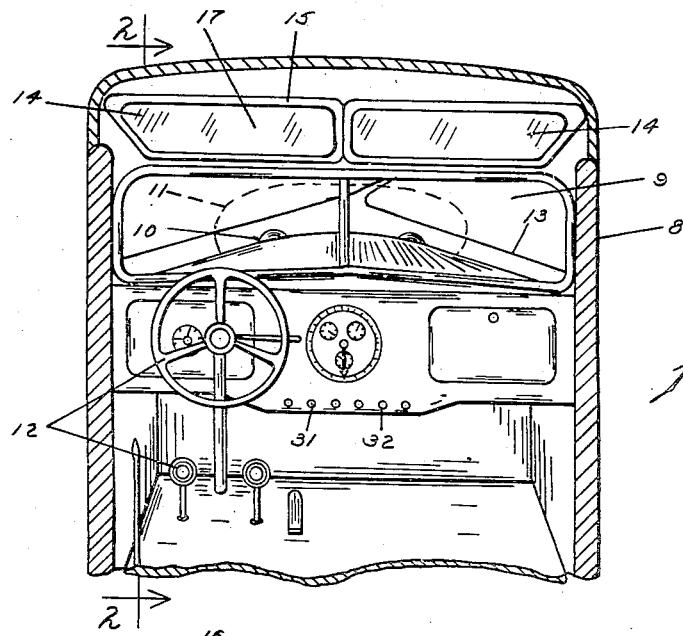
Fig 1
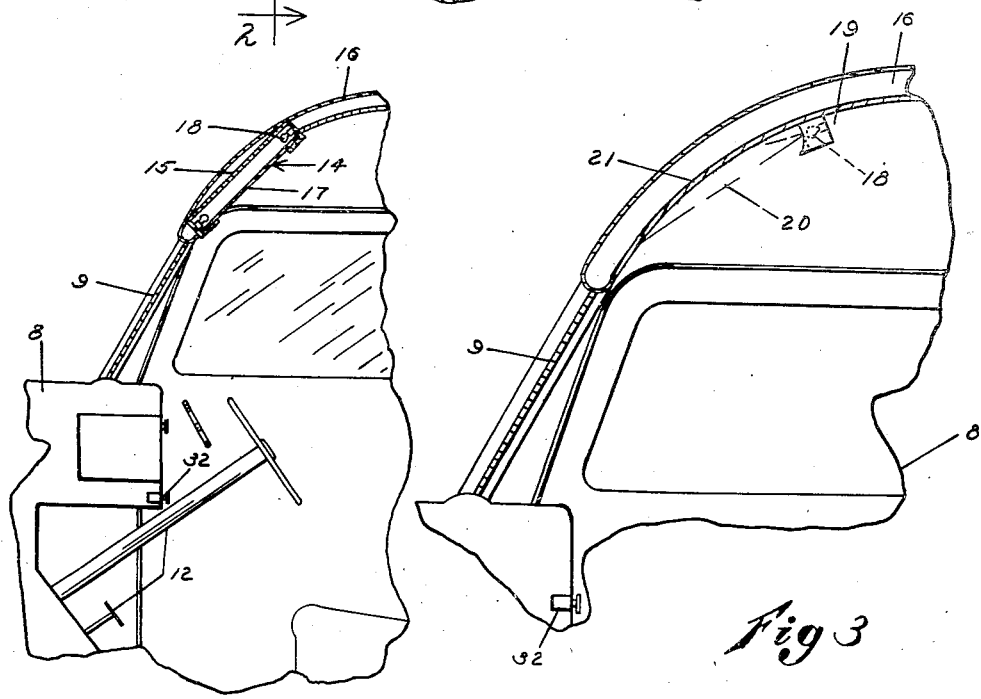
Fig 2
Fig 3
INVENTORS.
Oliver C. Schlemmer.
BY Roger E. Schlemmer.
Murray, Sackhoff & Paddack.
ATTORNEYS.

March 31, 1942. O. C. SCHLEMMER ET AL 2,277,784
NIGHT DRIVING LIGHT FOR AUTOMOBILE INTERIORS
Filed June 26, 1939 2 Sheets-Sheet 2
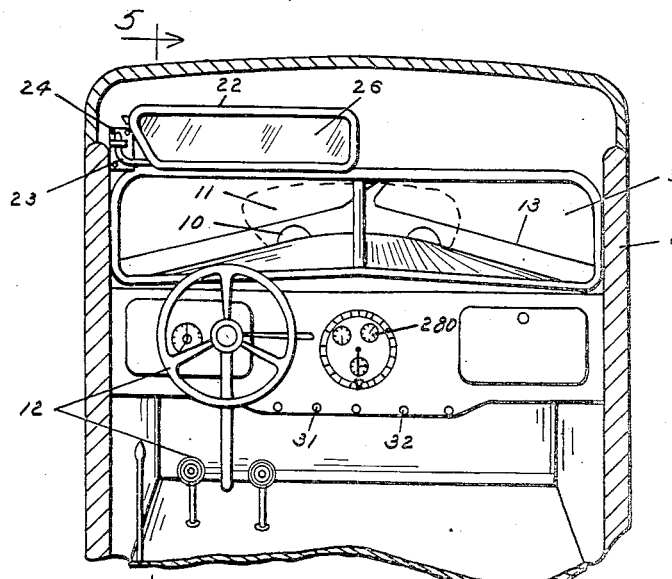
Fig 4
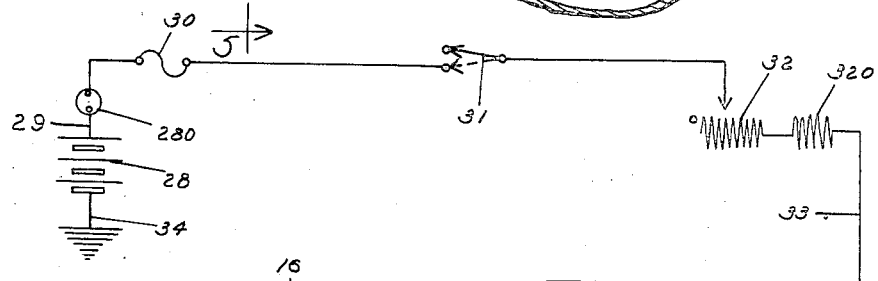
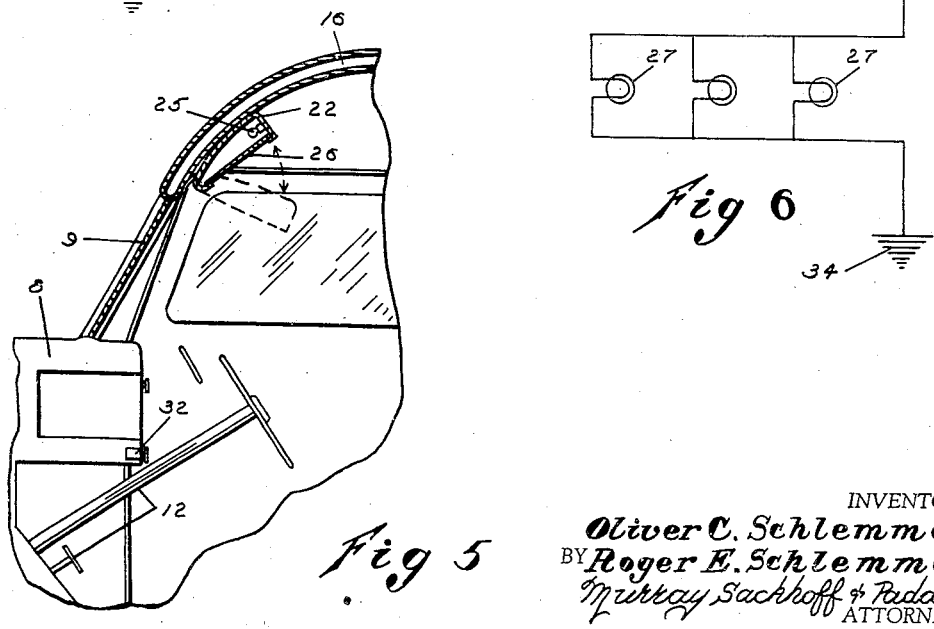
Fig 6
Fig 5
INVENTORS.
Oliver C. Schlemmer.
BY Roger E. Schlemmer.
Murray Sackhoff & Paddack.
ATTORNEYS.

Patented Mar. 31, 1942

2,277,784

UNITED STATES PATENT OFFICE 2,277,784

NIGHT DRIVING LIGHT FOR AUTOMOBILE INTERIORS

Oliver C. Schlemmer, Cincinnati, Ohio, and Roger E. Schlemmer, Kansas City, Mo.

Application June 26, 1939, Serial No. 281,162

6 Claims. (Cl. 240—7.1)

This invention relates to means for creating conditions to alleviate visual disadvantages attending the operation at night of vehicles having headlights or the equivalent and is directed especially to a night driving light, effective in the interior of motor vehicles, which produces physiological optical, physiological, and psychological improvements in the seeing of the driver thereof or any passenger undertaking essentially the same seeing job.

It is an object of this invention to provide a night driving light for the operators of motor vehicles which will provide conditions for improving their seeing while engaged in the visual task attending the driving of the vehicles at night.

Another object of the invention is to provide a zone of diffused illumination which is disposed above and to the front of the operator, and outside of his central field of vision, for displacing darkness over a considerable portion of the operator's upper peripheral field of vision.

A further object of the invention is to provide a zone of diffused illumination, positioned as described, which has a brightness adjusted to be, as apparent to the operator, within the pleasing range embracing equality with the brightness of the operator's central field of vision.

A further object of the invention is to provide a zone of diffused illumination, positioned as described, which has a color quality that is agreeable as apparent to the operator.

Other objects of the invention will be apparent from the following specification and drawings, in which:

Figure 1 is a cross-sectional view of a motor vehicle taken forwardly from a vertical plane transversely of the operator's station and showing the night driving light in one of its forms.

Figure 2 is a cross-sectional view of the motor vehicle of Figure 1 taken to the side from a vertical plane through line 2—2 of Figure 1.

Figure 3 is an enlarged cross-sectional view similar to Figure 2 showing an additional form of the night driving light.

Figure 4 is a cross-sectional view of a motor vehicle taken forwardly from a vertical plane transversely of the operator's station and showing a further form of the night driving light.

Figure 5 is a cross-sectional view of the motor vehicle of Figure 4 taken to the side from a vertical plane through line 5—5 of Figure 4.

Figure 6 is a schematic electrical wiring diagram for those forms of night driving light which use incandescent lamps as the source of light.

When a vehicle is being operated on an unlighted country highway, the operator's visual picture of the area in front of the vehicle, including the roadway and other objects, illuminated by the headlights represents the operator's central field of vision; this is the meaning of the term "central field of vision" as used herein. The more extensive remaining part of the entire field of vision of the operator, looking at his central field of vision, which surrounds the central field of vision, represents the operator's peripheral field of vision; this is the meaning of the term "peripheral field of vision" as used herein.

In most present day motor vehicles being operated at night, the operator's peripheral field of vision is practically dark; this is particularly true of his upper peripheral field of vision—i. e., approximately that portion of the peripheral field of vision which is above a plane parallel to the roadway and through the operator's eyes; this is the meaning of the term "upper peripheral field of vision" as used herein. The remainder of the peripheral field will be referred to as the "lower peripheral field of vision." On roadways having street lighting, illuminated signs, or other illumination, the brightness of the operator's central field of vision may be increased somewhat, by these other lights, over that provided by the headlights alone; and, in addition, some parts of the operator's peripheral filed of vision may be illuminated by these other lights where otherwise they would be dark. However, in this case also, the operator's upper peripheral field of vision usually remains quite dark.

The aforementioned darkness, and the resulting difference in brightness of illumination in the upper peripheral and central fields of vision, has a detrimental effect upon the efficiency and comfort of the seeing of a motor vehicle operator, which can be alleviated by the use of suitable illumination in his upper peripheral field of vision. For this purpose, we have found that the following principles apply:

It is observable that illumination seems to be more natural and beneficial when it is provided in a zone in the operator's upper peripheral field of vision than when it is provided in the lower peripheral field of vision. (In this connection, it may be noted that some motor vehicles have been provided with a switch to extinguish the instrument panel lights, which are in the operator's lower peripheral field of vision.)

The illumination provided in the upper peripheral field of vision should be of a soft, diffused nature. It may be a self-luminous zone, the reflection of light rays directed on a surface from a light source, a stimulated fluorescent material, or illumination obtained in any other suitable manner.

The illumination provided in the upper peripheral field of vision should be effective for displacing darkness over a considerable portion of that field i. e., to appear as a surface, rather than merely as a spot, point, or narrow band of illumination. A luminous zone subtending, in the aggregate, a solid visual angle of about the same magnitude as that subtended by the central field of vision is suitable, although zones subtending angles greater or less than this also are satisfactory. The luminous zone should be of such visual size as to be, as apparent to the operator, in pleasing visual balance with the central field of vision. The illumination in the specified zone may appear to be one continuous field or it may appear to be discontinuous by reason of the use of two or more separate sub-fields in the zone, as for artistic effect, although the discontinuousness should not be such as to be annoying to the operator.

The brightness of the illumination provided in the upper peripheral field of vision should be, as apparent to the operator, within the pleasing range embracing equality with the brightness of the central field of vision. As apparent to the operator, the brightness of said illumination, as it is increased from darkness, first becomes noticeable at a low value—less than that of the operator's central field of vision. As the brightness seems to approach that of the central field of vision, its effect becomes more pronounced and pleasing. As the brightness is increased further and appears noticeably greater than that of the central field of vision, it commences to become annoying and glare-like and to detract from the operator's ability to see in the central field of vision. The suitable effective pleasing range of brightness just described is the range which is meant hereby by the clause "diffusely luminous zone having a brightness adjusted to be, as apparent to the operator, in substantial equality with the brightness of the central field of vision." This suitable range is not difficult to determine. It will be evident that the exact limits of this suitable brightness range will not be constant for all conditions. It is significant that the highest brightness required for the illumination of this invention is much less than the brightness of the conventional ceiling or interior reading lights, when actuated, in present-day motor vehicles. The illumination of our invention is not intended to cause details of the interior of the vehicle, outside of said zone, to be emphasized for critical observation—a light which would do so would be detrimental to the operator's seeing while driving at night.

The color quality of the illumination provided in the upper peripheral field of vision should be agreeable, as apparent to the operator, and in suitable relationship to the color quality of the central field of vision. A green color quality, for example, has been found satisfactory for this purpose.

We have found that the application of the above-described principles to motor vehicles and the like improves the operator's seeing, in what may be its physiological optical, physiological, and psychological aspects, as he is engaged chiefly in the continuing critical observation of his central field of vision in the course of driving at night.

The embodiment of our invention comprises a motor vehicle 8 having a conventional operator's station (Figure 1), a windshield 9, and headlights 10, the latter being adapted, when actuated, to illuminate the area in front of the vehicle indicated by the dotted lines 11 which includes part of roadway 13. The operator of the vehicle is seated behind controls 12 in a position enabling him to observe objects in this illuminated area by focusing his eyes thereupon as for the critical visual task of driving at night. The visual picture of the illuminated area 11 occupies a relatively small part of the entire field of vision of said operator and is termed the central field of vision (as previously defined).

Provided that all other lights about the vehicle and upon the roadway 13 and adjoining countryside are extinguished, the part of the operator's complete field of vision, other than the visual picture of the illuminated area 11 upon objects in which the eyes are focused, is darkness and is termed the peripheral field of vision (as previously defined). The absence of illumination in the peripheral field of vision and the great difference in brightness of illumination between the two fields of vision has a detrimental effect upon the efficiency and comfort of the seeing of the operator of the vehicle, which is alleviated by the provision of a diffusely luminous zone 14, of suitable brightness, color, and visual size as previously described, in the upper peripheral field of vision of the operator whilst he is focusing his eyes upon the illuminated area 11 of his central field of vision.

As indicated in Figures 1 and 2, one means for creating a suitable luminous zone in the upper peripheral field of vision of the operator comprises an elongated box-like light chamber 15 mounted interiorly of the roof 16 of the motor vehicle body and disposed above and transversely of the effective window of the windshield 9 i. e., the forward opening in the vehicle through which the operator can see for critical vision. The light chamber contains light sources 18 and has an open portion which is provided with a pane 17 of translucent material interposed between the light chamber and the operator's station. With white light sources 18, a translucent pane having a green color quality, for example, has been found satisfactory.

Another means for creating a suitable zone of diffused illumination in the upper peripheral field of vision of the operator and positioned substantially as shown in Figure 1 is by the use of a light box 19 (Figure 3) which is located on the ceiling of the motor vehicle body and adapted to direct light rays 20 of appropriate color upon the interior limited surface 21 of said ceiling or of an especially composed surface in substantially the same location. The illuminated surface 21 is disposed above and transversely of the effective window of the windshield similarly as provided in the form of the invention shown in Figures 1 and 2.

An additional form of the invention is shown in Figures 4 and 5, like reference numerals indicating the same part in the two figures. As shown therein, a further means for creating a suitable luminous zone in the upper peripheral field of vision of the operator comprises a chamber-like sun visor 22 which has an arm 23 extending therefrom for conventional pivotal engagement with a bracket 24, the latter being fastened to the roof 16 of the vehicle body. The sun visor light chamber contains light sources 25 and has, in its side which is exposed when in the upward position, an opening which is provided with a pane 26 of translucent material interposed between the light chamber and the operator's station. With white light sources 25, a translucent pane having a green color quality, for example, has been found to be satisfactory. As shown in Figure 5, the full-line position indicates the disposition of the sun visor for use as a night driving light and the dotted line indicates its position for shielding the eyes of the operator from the glare of the sun.

The source of light mentioned for use with the devices described hereinbefore may be relatively small incandescent lamps 27 (Figure 6) energized from a battery 28, positioned on the vehicle, by means of an electric circuit indicated as electric line 29, ammeter 280, fuse 30, night driving light off-on switch 31, rheostat 32, ballast resistance 320, electric line 33, lamps 27, and return electric line 34. The rheostat provides means for the operator to adjust the brightness of the luminous zone of the night driving light to the value having the desired apparent relation to that of the operator's central field of vision 11. The ballast resistance 320 in the circuit is used when it is desired to supplement the rheostat and to limit the brightness which can be obtained, to the predetermined maximum value. Under certain conditions the rheostat may be eliminated, if desired, and the ballast resistance made of such value as to provide a fixed brightness of a satisfactory average value. The circuit may be arranged, if desired, so that the switch which changes the headlights from low-beam to high-beam operation also will change the ballast resistance in the circuit from a lower to a higher value, and vice versa, if this should be necessary to maintain the brightness of the night driving light luminous zone in proper relationship to that of the central field of vision. The closure of the electric line between fuse 30 and night driving light off-on switch 31 may, if desired, be placed under control of the off-on switch which actuates the vehicle headlights so that switch 31 cannot energize the light sources 27 while the headlights are off and so that the light sources 27 may be energized while the vehicle headlights are on. The circuit may be arranged, if desired, for selecting and controlling any one of several differently colored light sources 27 for the purpose of changing the color quality of the night driving light luminous zone. Other variations of the electrical circuit within the scope of this invention will be evident.

As a guide to assist in the selection of proper illuminating means and rheostatic control therefor in the practice of our invention, brightness values based on measurements made with a Macbeth illuminometer from the operator's station of a motor vehicle under actual conditions are given, by way of practical illustration, in the following table:

All of the apparent foot candle values below are for objects in the central field of vision illuminated only by the low-beam headlights. Values for the high-beam headlights are proportionally somewhat smaller.

| Brightness of the night driving light luminous zone as apparent to the operator | Brightness of night driving light luminous zone, in apparent foot candles, with different objects in the central field of vision | | | | Ratio of brightnesses: night driving light luminous zone to central field of vision |
|---|---|---|---|---|---|
| | New Tarvia | Dry brush | Old concrete | Snow | |
| Glaring | .65 | 1.15 | 2.32 | 4.55 | 13.0 |
| Annoying | .28 | .50 | 1.01 | 1.96 | 5.6 |
| Noticeably higher than that of the central field | .14 | .25 | .50 | .98 | Approximate efficient practical range of brightness { 2.8 |
| Equal to that of the central field | .05 | .09 | .18 | .35 | 1.0 |
| Noticeably lower than that of the central field | .01 | .02 | .04 | .07 | .2 |

A careful study of this table will show that frequent adjustment of the brightness of the illumination of our invention is not indicated as necessary in order to maintain the hereinbefore mentioned relationship between the brightness of the luminous zone in the upper peripheral field of vision and changing conditions of brightness of the objects illuminated by the vehicle headlights in the operator's central field of vision.

It will be understood that the exact limits of the pleasing brightness range for the zone of illumination in the upper peripheral field of vision may vary somewhat with the individual observer as well as with different conditions of the road and roadside and the vehicle headlights. The visual disadvantages that have heretofore attended the night operation of motor vehicles, or have been experienced under generally comparable conditions, are materially reduced or alleviated by the use of the auxiliary illuminating means of our invention.

Other forms and modifications of the night driving light may be employed within the scope of this invention provided that the means function to create a diffusely luminous zone—not an incidental result of general interior illumination but effective to improve seeing conditions for night driving in the absence of general interior illumination—for displacing darkness over a considerable portion of the upper peripheral field of vision of the operator looking at the central field of vision, said luminous zone having a brightness adjusted to be, as apparent to the operator, within the pleasing range embracing equality with the brightness of the central field of vision and having a color quality which is agreeable as apparent to the operator.

What is claimed is:

1. In a motor vehicle, the combination of an operator's station, headlights for illuminating remote objects the visual picture of which comprises the central field of vision for the operator at said station, a night driving light consisting of means for producing a diffusely luminous zone wholly outside of the limits of the effective window of the windshield and of position and extent so as to displace darkness, in the absence of general interior illumination, over a considerable portion of the upper peripheral field of vision of said operator looking at said central field of vision, said luminous zone having a brightness adjustable to be, as apparent to the operator, in substantial equality with the brightness of said central field of vision, and means for controlling the brightness of the luminous zone.

2. In a motor vehicle, the combination of an operator's station, headlights for illuminating remote objects the visual picture of which comprises the central field of vision for the operator at said station, a night driving light consisting of means for producing a diffusely luminous zone of position and extent so as to displace darkness, in the absence of general interior illumination, over a considerable portion of the upper peripheral field of vision of said operator looking at said central field of vision, said luminous zone having a brightness adjusted to be, as apparent to the operator, in substantial equality with the brightness of said central field of vision, and means for controlling the intensity of the luminous zone.

3. The method of improving seeing conditions for night driving in a motor vehicle having an operator's station and headlights for illuminating remote objects the visual picture of which comprises the central field of vision for the operator at said station, which consists in illuminating remote objects by means of the vehicle's headlights, creating a diffusely luminous surface-like zone of illumination in the vehicle wholly outside of the operator's path of forward road vision over a considerable portion of the upper peripheral field of vision of the operator looking at the central field of vision, and adjusting the brightness of said zone to pleasing substantial equality, as apparent to the operator, with the brightness of the central field of vision.

4. In a motor vehicle, the combination of an operator's station, headlights for illuminating remote objects the visual picture of which comprises the central field of vision for the operator at said station, and a night driving light consisting of means for producing a diffusely luminous zone wholly above and transversely of the effective window of the windshield and of extent sufficient to displace darkness, in the absence of general interior illumination, over a considerable portion of the upper peripheral field of vision of said operator looking at said central field of vision, said luminous zone having a brightness adjusted to be, as apparent to the operator, within the pleasing range embracing equality with the brightness of said central field of vision, said means comprising a fixed, front-ceiling mounted light chamber having a side exposed to the operator's station, a light source located within the light chamber, a translucent pane located in said side and interposed between the light chamber and the operator's station, and control means for varying the intensity of the light source.

5. In a motor vehicle, the combination of an operator's station, headlights for illuminating remote objects the visual picture of which comprises the central field of vision for the operator at said station, and a night driving light consisting of means for producing a diffusely luminous zone wholly above and transversely of the effective window of the windshield and of extent sufficient to displace darkness, in the absence of general interior illumination, over a considerable portion of the upper peripheral field of vision of said operator looking at said central field of vision, said luminous zone having a brightness adjusted to be, as apparent to the operator, within the pleasing range embracing equality with the brightness of said central field of vision, said means comprising a fixed, ceiling-mounted light box having opaque sides and a light source located within the light box, a diffusely reflecting surface positioned transversely of and above the windshield and in the upper peripheral field of vision of the operator, said box being positioned and apertured for directing light rays on the reflecting surface, and control means for varying the intensity of the light source.

6. In a motor vehicle, the combination of an operator's station, headlights for illuminating remote objects the visual picture of which comprises the central field of vision for the operator at said station, and a night driving light consisting of means for producing a diffusely luminous zone wholly above and transversely of the effective window of the windshield and of extent sufficient to displace darkness, in the absence of general interior illumination, over a considerable portion of the upper peripheral field of vision of said operator looking at said central field of vision, said luminous zone having a brightness adjusted to be, as apparent to the operator, in substantial equality with the brightness of said central field of vision, said means comprising a movably mounted, chamber-like sun visor having, in its non-sun-shielding position, a side exposed to the operator's station, a light source located within the visor, a translucent pane located substantially throughout said side and interposed between the light chamber and the operator's station, and control means for varying the intensity of the light source.

OLIVER C. SCHLEMMER.
ROGER E. SCHLEMMER.